March 13, 1928. 1,662,545
E. SPELTA
SPRAY SCREEN
Filed Feb. 23, 1926
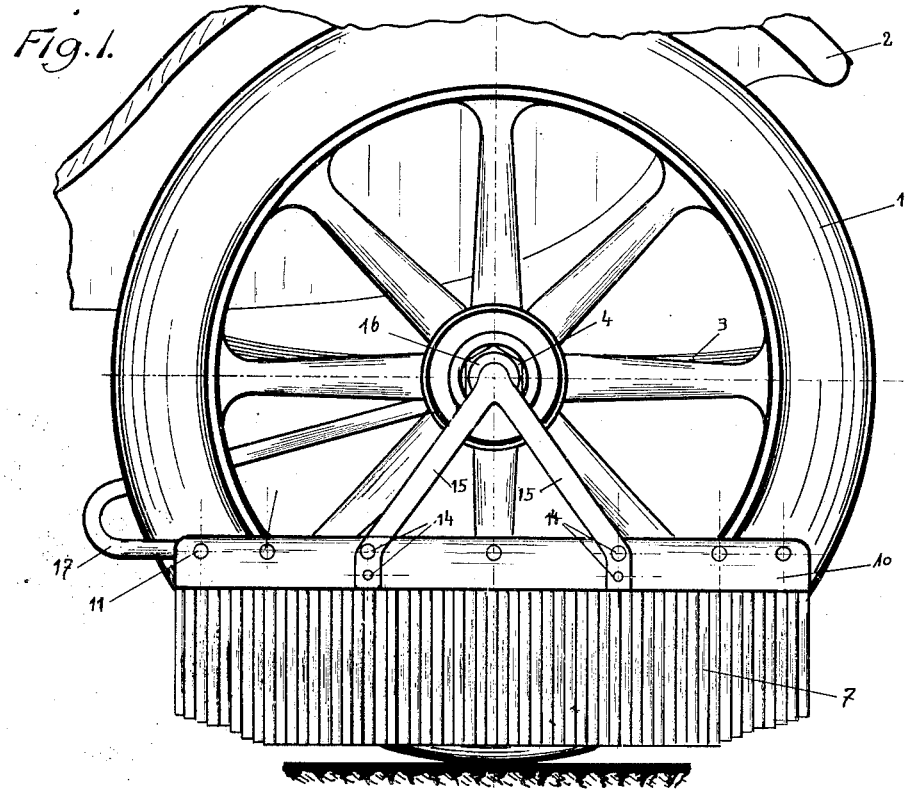
Fig. 1.
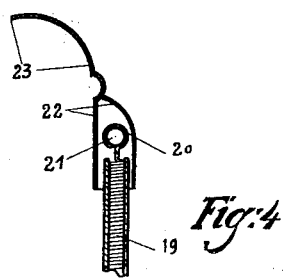
Fig. 4.
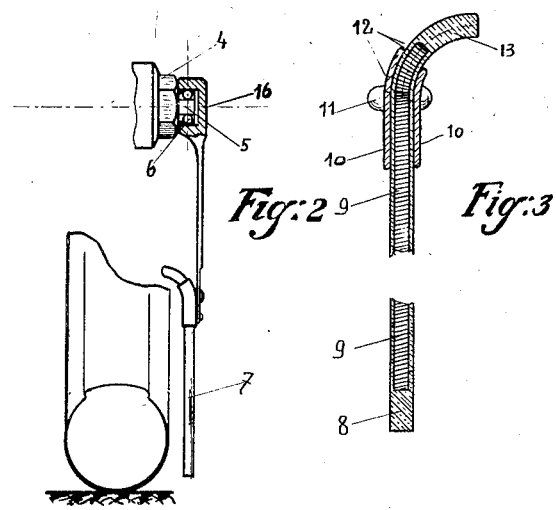
Fig. 2    Fig. 3
Inventor
Egidio Spelta Patented Mar. 13, 1928.

1,662,545

UNITED STATES PATENT OFFICE.

EGIDIO SPELTA, OF TURIN, ITALY.

SPRAY SCREEN.

Application filed February 23, 1926, Serial No. 90,044, and in Italy February 26, 1925.

This invention relates to a spray screen capable of efficient protection against the sprays projected by the wheel of a motor vehicle running on muddy ground and of following any unevenness of the road, without deterioration and without its efficiency being lessened or altered.

According to this invention the spray protecting device consists of a fringe of resilient material carried by a stiff support which is secured to the vehicle by any suitable means so that the fringe keeps parallel to the wheel on the outer side of same.

The accompanying drawing shows, by way of example, a constructional form of the spray screen according to this invention.

Figure 1 shows a vehicle wheel provided with the spray screen.

Figure 2 is a side view.

Figure 3 is a section of the spray-screen on line 3—3 of Fig. 1, and

Figure 4 is a vertical cross section of a modified construction.

Referring to Figs. 1 to 3, 1 denotes a wheel, 2 the mud-guard and 3 the suspension spring of a motor vehicle. The cap 4 of the wheel axle carries a pivot 5, to which the spray screen is suspended by means of a roller bearing 6. Said spray screen comprises a fringe 7 consisting of a series of tubes 8 of resilient material, preferably rubber, within which is lodged a wire spiral 9 for stiffening each fringe element and increasing its resistance to the mud projections. The fringe 7 is clamped between two strong metal ledges 10 secured together by screws 11. The upper edges 12 of the ledges 10 are curved towards the wheel 1 and each resilient tube 8 projects beyond the curved portions 12 of the metal ledges.

The projecting portions 13 of the tubes are also curved towards the wheel in order to prevent the mud or liquid projected by the wheel 1 being thrown outside by the upper portion of the spray screen.

To the metal ledges 10 are fixed by screws 14 the arms 15 which unite above in a box 16 in which is arranged the roller bearing 6. In order to prevent any oscillation of the spray-screen a rod 17 conveniently bent and stiffly connected to the wheel axle is fixed to an end of the ledges 10.

In the modified form shown in Figure 4, the fringe consists of sticks 18 of resilient material with a core 19 formed of a metallic spiral projecting at one end of the tube and provided on said projecting portion with an eye 20, by means of which the fringe elements are suspended from a rod 21 fixed to both ends of a metal box 22. The box extends on one side into a portion 23 curved towards the wheel and having the same purpose as the portion 13 in the first construction.

It is clear that the fringe elements, although independent of one another, form together an efficient guard against mud and liquid projections; moreover as said elements are sufficiently movable, resilient and resistent, they follow promptly every unevenness of the road, sliding along any obstacle, without any noticeable injury to the spray screen or deficiency in operation.

This spray screen shows over the apparatus known heretofore the advantage of being simple in construction and consequently cheap in manufacture; easily fitted to the car while its parts more subject to wear and tear are also easily interchangeable.

What I claim is:

1. The combination with a vehicle wheel, of a spray screen comprising a support arranged parallel to the wheel, a screen composed of a plurality of independent juxtaposed flexible tubes freely suspended from said support, each tube having a resilient metallic core, and means for holding said support in fixed relation to the wheel.

2. The combination with a vehicle wheel, of a spray screen comprising two parallel clamping plates having inwardly curved upper edge portions, a plurality of independent juxtaposed flexible tubes clamped between said plates and having their upper ends extending above and curving inwardly above the clamping plates, the lower portions of said tubes being freely suspended below said plates in a vertical plane, each tube having a spiral metallic core, and means for holding the clamping plates in fixed relation to the wheel.

3. In combination with a vehicle wheel a spray screen comprising a fringe consisting of rubber tubes having a core formed of a wire spiral, a couple of strong ledges between which said fringe is clamped, an extension of said fringe above said ledges, said extension being curved towards the wheel, in order to prevent the mud and liquid from the road being projected to the outside by the upper screen portion, arms fixed to said ledges and uniting in a box in which is arranged a ball bearing mounted on a pivot fast with the nut holding the wheel in position on its own pivot and means for preventing any oscillation of the spray screen.

In testimony that I claim the foregoing as my invention, I have signed my name.

EGIDIO SPELTA.